(12) United States Patent
McCord et al.

(10) Patent No.: US 10,586,175 B2
(45) Date of Patent: Mar. 10, 2020

(54) SYSTEM AND METHOD FOR AN OPTIMIZED, SELF-LEARNING AND SELF-ORGANIZING CONTACT CENTER

(71) Applicant: NEWVOICEMEDIA, LTD., Basingstoke, Hampshire (GB)

(72) Inventors: Alan McCord, Frisco, TX (US); Ashley Unitt, Basingstoke (GB)

(73) Assignee: NEWVOICEMEDIA LTD., Hampshire (GB)

( * ) Notice: Subject to any disclaimer, the term of this patent is extended or adjusted under 35 U.S.C. 154(b) by 64 days.

(21) Appl. No.: 15/445,869

(22) Filed: Feb. 28, 2017

(65) Prior Publication Data
US 2017/0169325 A1 Jun. 15, 2017

Related U.S. Application Data (63) Continuation-in-part of application No. 15/181,384, filed on Jun. 13, 2016, now abandoned, which is a continuation of application No. 15/135,503, filed on Apr. 21, 2016, now abandoned, which is a continuation-in-part of application No. 14/875,686, filed on Oct. 5, 2015, now abandoned, which is a continuation of application No. 14/555,912, filed on
(Continued)

(51) Int. Cl.
| | | |
|---|---|---|
| G06N 3/00 | (2006.01) | |
| H04M 3/523 | (2006.01) | |
| H04M 3/51 | (2006.01) | |
| G06N 20/00 | (2019.01) | |
| G06F 17/27 | (2006.01) | |
| G06N 5/04 | (2006.01) | |
| G06N 7/00 | (2006.01) | |
| G06F 16/35 | (2019.01) | |
| G06F 16/332 | (2019.01) | |

(52) U.S. Cl.
CPC .......... *G06N 20/00* (2019.01); *H04M 3/5183* (2013.01); *H04M 3/5235* (2013.01)

(58) Field of Classification Search
CPC ............ H04L 65/1069; H04L 65/1076; H04M 2203/655; H04M 3/42068; H04M 3/523; H04M 7/0024; H04M 3/5235; H04M 3/5183; G06N 20/00
See application file for complete search history.

(56) References Cited

U.S. PATENT DOCUMENTS

6,757,362 B1 * 6/2004 Cooper ................. H04M 3/527
    379/88.01
9,779,760 B1 * 10/2017 Ouimette ............ H04M 3/5166
(Continued)

*Primary Examiner* — Lisa Hashem
(74) *Attorney, Agent, or Firm* — Brian R. Galvin; Brian S. Boon; Galvin Patent Law LLC (57) ABSTRACT

A system and method for an optimized, self-learning and self-organizing contact center has been developed. This system and method uses principles and tools of information theory, including the latent Dirichlet allocation which reduces information to specific predetermined topics and a distribution of topic related words to infer its hidden, generative underpinnings so to self-organize a contact center, infer its desired electronic versus human make up, and optimally route all customer requests to an electronic resource or a specific human agent best suited to respond to the request for maximal business value per interaction.

2 Claims, 6 Drawing Sheets

Related U.S. Application Data

Nov. 28, 2014, now abandoned, which is a continuation of application No. 14/286,358, filed on May 23, 2014, now abandoned.

(60) Provisional application No. 62/294,278, filed on Feb. 11, 2016.

(56) References Cited

U.S. PATENT DOCUMENTS

| | | | |
|---|---|---|---|
| 9,936,066 B1* | 4/2018 | Mammen | H04M 3/2218 |
| 2007/0198368 A1* | 8/2007 | Kannan | G06Q 10/0631 |
| | | | 705/26.41 |
| 2010/0158238 A1* | 6/2010 | Saushkin | G06Q 10/06 |
| | | | 379/265.12 |
| 2011/0010173 A1* | 1/2011 | Scott | H04M 3/42221 |
| | | | 704/235 |
| 2011/0060983 A1* | 3/2011 | Cai | G06F 16/9562 |
| | | | 715/254 |
| 2014/0044246 A1* | 2/2014 | Klemm | H04M 3/523 |
| | | | 379/93.01 |
| 2015/0242410 A1* | 8/2015 | Pattabhiraman | G06Q 10/06 |
| | | | 707/728 |
| 2015/0281445 A1* | 10/2015 | Kumar | H04M 3/5166 |
| | | | 379/88.01 |
| 2016/0036973 A1* | 2/2016 | Harasimiuk | H04L 51/32 |
| | | | 379/265.13 |
| 2016/0227034 A1* | 8/2016 | Kulkarni | H04M 3/493 |
| 2018/0007205 A1* | 1/2018 | Klein | H04M 3/5166 |
| 2018/0032886 A1* | 2/2018 | Danson | G06N 99/005 |
| 2018/0084111 A1* | 3/2018 | Pirat | H04M 3/5183 |
| 2018/0091653 A1* | 3/2018 | Miller | H04M 3/42221 |
| 2018/0191905 A1* | 7/2018 | McCoy | G06Q 30/016 |
| 2018/0218729 A1* | 8/2018 | Saini | G06F 16/94 |
| 2018/0375998 A1* | 12/2018 | Beilis | H04M 3/5175 |
| 2019/0215249 A1* | 7/2019 | Renard | G06F 3/0484 |

* cited by examiner

SYSTEM AND METHOD FOR AN OPTIMIZED, SELF-LEARNING AND SELF-ORGANIZING CONTACT CENTER

CROSS-REFERENCE TO RELATED APPLICATIONS

This application is a continuation-in-part of U.S. patent application Ser. No. 15/181,384, titled "SYSTEM AND METHOD FOR AN OPTIMIZED, SELF-LEARNING AND SELF-ORGANIZING CONTACT CENTER," and filed on Jun. 13, 2016, which is a continuation of abandoned U.S. patent application Ser. No. 15/135,503, titled "SYSTEM AND METHOD FOR AN OPTIMIZED, SELF-LEARNING AND SELF-ORGANIZING CONTACT CENTER", and filed on Apr. 21, 2016, which is a continuation-in-part of abandoned U.S. patent application Ser. No. 14/875,686 titled "CONVERSATION ANALYTICS", and filed on Oct. 5, 2015, which is a continuation of abandoned U.S. patent application Ser. No. 14/555,912 titled "CONVERSATION ANALYTICS", and filed on Nov. 28, 2014, which is a continuation of abandoned U.S. patent application Ser. No. 14/286,358 titled "CONVERSATION ANALYTICS", filed on May 23, 2014, the entire specifications of each of which are incorporated herein in their entirety by reference. This application is a continuation-in-part of U.S. patent application Ser. No. 15/181,384, titled "SYSTEM AND METHOD FOR AN OPTIMIZED, SELF-LEARNING AND SELF-ORGANIZING CONTACT CENTER," and filed on Jun. 13, 2016, which is a continuation of abandoned U.S. patent application Ser. No. 15/135,503, titled "SYSTEM AND METHOD FOR AN OPTIMIZED, SELF-LEARNING AND SELF-ORGANIZING CONTACT CENTER", and filed on Apr. 21, 2016, which claims the benefit of, and priority to, expired U.S. provisional patent application Ser. No. 62/294,278 titled "SYSTEM AND METHOD FOR AN OPTIMIZED, SELF-LEARNIG AND SELF-ORGANIZING CONTACT CENTER", filed on Feb. 11, 2016, the entire specification of each of which is incorporated herein in its entirety by reference.

BACKGROUND OF THE INVENTION

Field of the Invention

The present invention is in the field of enterprise contact center operations, more specifically, optimization of resource usage; information, electronic, and personnel; in enterprise contact centers when routing customer inquiries.

Discussion of the State of the Art

Contact centers have become a necessity for the majority of enterprises. Operating an enterprise contact center efficiently, however continues to be daunting task. For service calls, no matter the amount of training and knowledge base support, agents differ greatly in areas of ability and situational ability. Even when relative proficiencies of agents appear to be known, it is nearly impossible to analyze incoming calls quickly and accurately enough to correctly route the calls using human pre-screeners. This all assumes that the center is populated with the correct "experts" for current customer needs and in the correct proportions. This has led many enterprises to measure call center success and the worth of their agents using metrics such as call queue wait times, mean call turnover times, and adherence to canned procedural documents, none of which really relate to business value. Successful web based service is also extremely difficult to achieve as, for the most part, the customer is left to delve through the available knowledge using keywords that they have generated, which themselves lead to long lists of links that are often ranked by criteria irrelevant to their search. The process often uses significant amounts of time to arrive at the information they desire, if at all. The end result of all of this is mediocre customer satisfaction, or worse, concerning an enterprise's contact center and greatly reduced business value for the entire operation.

The conditions are similar on the sales side. Currently, it is quite difficult to connect a potential customer to the "right" sales person with confidence or, on the web side to quickly get those potential customers to exact information that they need to purchase the enterprises product over that of another. As with service inquiries, the buyer's journey has remained largely reliant on their ingenuity, and possibly a little luck.

More recently, some advancement has been made to improve the union of contact center customers with the information that they require, thereby improving the business value of an enterprise's contact center, through the use of path analytics. In path analytics, the paths taken by a subset of previous customers who have used a specific keyword or small set of keywords on the enterprise's contact center web pages, within contact center emails, or during interaction with the contact center's IVRs are analyzed with some predetermined successful endpoint the goal. These goals may be that the customer purchases a product, the customer responds favorably to a particular marketing campaign, the customer purchases an upgrade to what they originally came for, the customer gives a highly favorable review in a service satisfaction survey. The analyzed paths that go from keywords to achievement of the goal in the least number of "steps" are considered to be the most efficient and future customers who use the same keyword or small set of keywords are henceforth directed down that path. A variant of this path analysis process occurs when a subset of former customers follow a particular path of web page links on an enterprise's web site that ends in a specific, desired goal and that pathway is then codified so that future customers follow it.

While an improvement, path analytics suffers from several shortcomings which make it a weak driver of business value in the contact center sphere. It is passive and retrospective and thus cannot adapt to changing conditions as products mature or are replaced. It relies on a limited number observed states that provide only simplistic deterministic relationships between some data or event within the contact center and an outcome. It relies on a set of decisive endpoints without any glimpse, statistical or otherwise of the customer's decision process or hidden motivation, as a result it cannot give any indication of steps toward optimizing contact center constituency.

What is needed is a system to predictively closely match all contact center related information with customer requests to provide that information in the most efficient and satisfactory manner by routing the customer to the contact center resource, human or electronic with command of the specific knowledge most optimal to both the topic and depth of the customer's request. What is further needed is a system that can accurately and predictively determine the characteristic set needed by prospective contact center resources, both electronic and human, the characteristic set possessed by each of the current call center resources, both electronic and human and their best placement within contact center organization, potentially geographical, to maximize efficiency and business value in the areas of sales and service contract satisfaction.

SUMMARY OF THE INVENTION

The inventor has developed a system for an optimized, self-learning and self-organizing contact center which uses principles of information theory to infer hidden variables that has led a contact center customer to initiate communication using a specific topic and set of related identifiers to route each customer to the contact center resource best equipped to respond.

The invention uses principles of information theory to infer hidden variables that has led a contact center customer to initiate communication using a specific topic and set of related identifiers to route each customer to the contact center resource best equipped to respond, as well as to predict the knowledge and skill sets that will be needed within the call center structure and to insure that current resources, both electronic and human, are deployed so as to maximize the business efficiency and effectiveness of the call center. Last, the systems use of information theory and continuous monitoring of contact operations allows it to rapidly react to maintain contact center efficacy as an enterprise's product line matures and business practices change.

According to a preferred embodiment of the invention, system for an optimized, self-learning and self-organizing contact center comprising: a topic based routing module stored in a memory of and operating on a processor of a computing device and an interaction information optimization module stored in a memory of and operating on a processor of a computing device. Wherein, the topic based routing module: receives requests from contact center customers, infers the topic distribution of the request based upon information theory based algorithms, routes the request to the contact center resource best suited to respond to the request. Wherein the interaction information optimization module: monitors all communication into and out of the contact center, analyzes communication streams for all topics and topic related identifiers, creates optimized relationships between identifiers present in analyzed communications and business value related topics attached to contact center resources using information theory algorithms and machine learning.

According to another preferred embodiment of the invention, method for an optimized, self-learning and self-organizing contact center, the method comprising the steps of: (a) receiving requests from customers of an enterprise to that enterprise's contact center, (b) analyzing those requests for topic information and topic related identifiers, (c) routing each request to the contact center resource best suited to respond to it; (d) continuously monitoring all communications into and out of the contact center, and (e) applying information theory algorithms and machine learning to optimize business value based upon information exchange, information distance and identifier to topic matching between incoming requests and outgoing responses.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

The inventor has conceived, and reduced to practice, various systems and methods for an optimized, self-learning and self-organizing contact center.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system possibly networked with others in a data processing center, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 1:
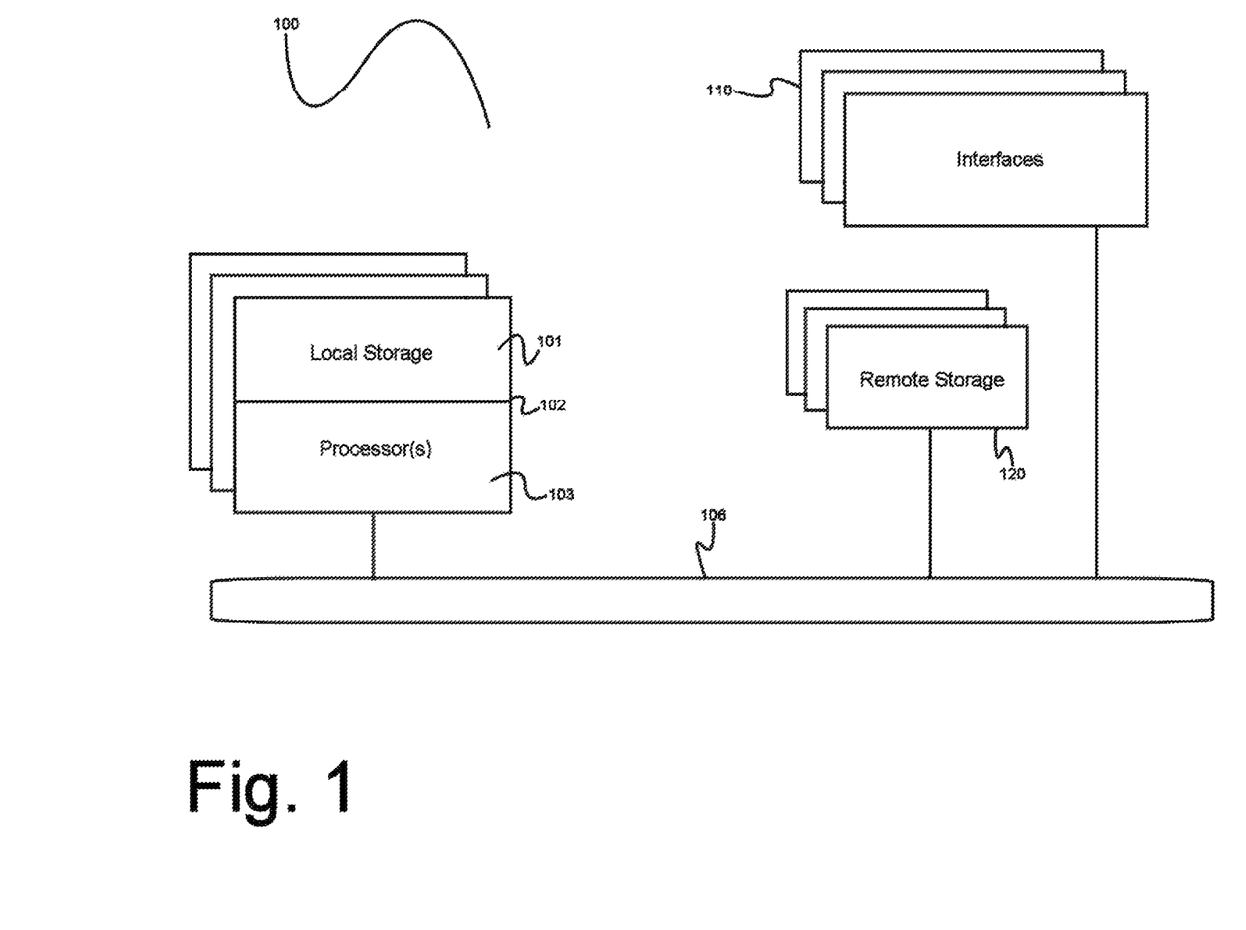
FIG. 1 is a block diagram illustrating an exemplary hardware architecture of a computing device used in various embodiments of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more buses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire, PCI, parallel, radio frequency (RF), Bluetooth, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RANI), and the like. Examples of program instructions include both object code, such as may be produced by a compiler, machine code, such as may be produced by an assembler or a linker, byte code, such as may be generated by for example a Java compiler and may be executed using a Java virtual machine or equivalent, or files containing higher level code that may be executed by the computer using an interpreter (for example, scripts written in Python, Perl, Ruby, Groovy, or any other scripting language).

Figure 2:
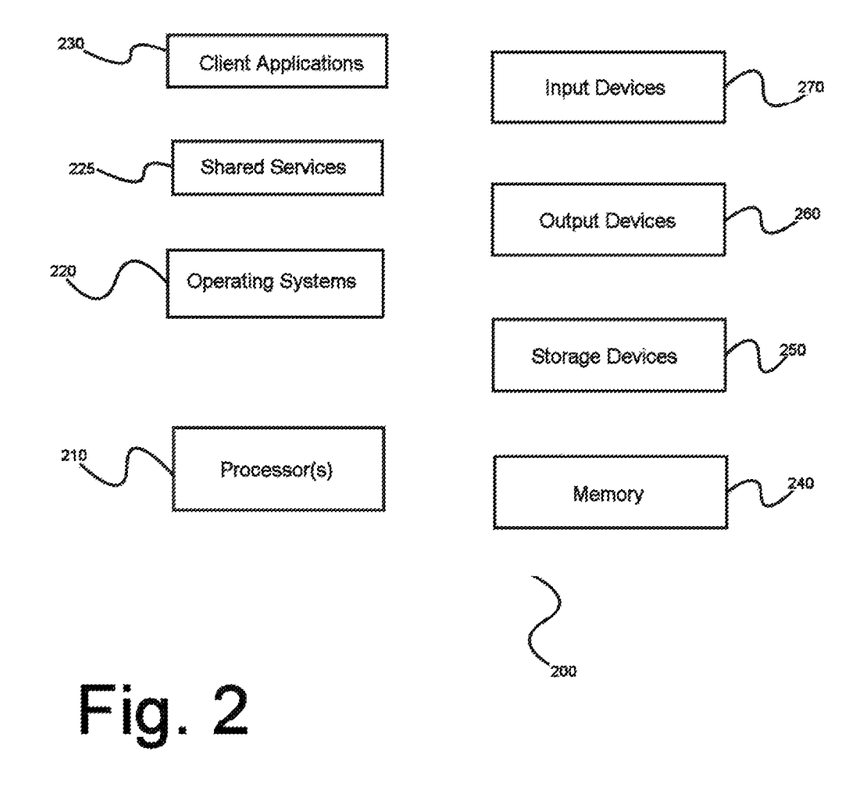
FIG. 2 is a block diagram illustrating an exemplary logical architecture for a client device, according to various embodiments of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows operating system, Apple's Mac OS/X or iOS operating systems, some variety of the Linux operating system, Google's Android operating system, or the like. In many cases, one or more shared services 225 may be operable in system 200, and may be useful for providing common services to client applications 230. Services 225 may for example be Windows services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
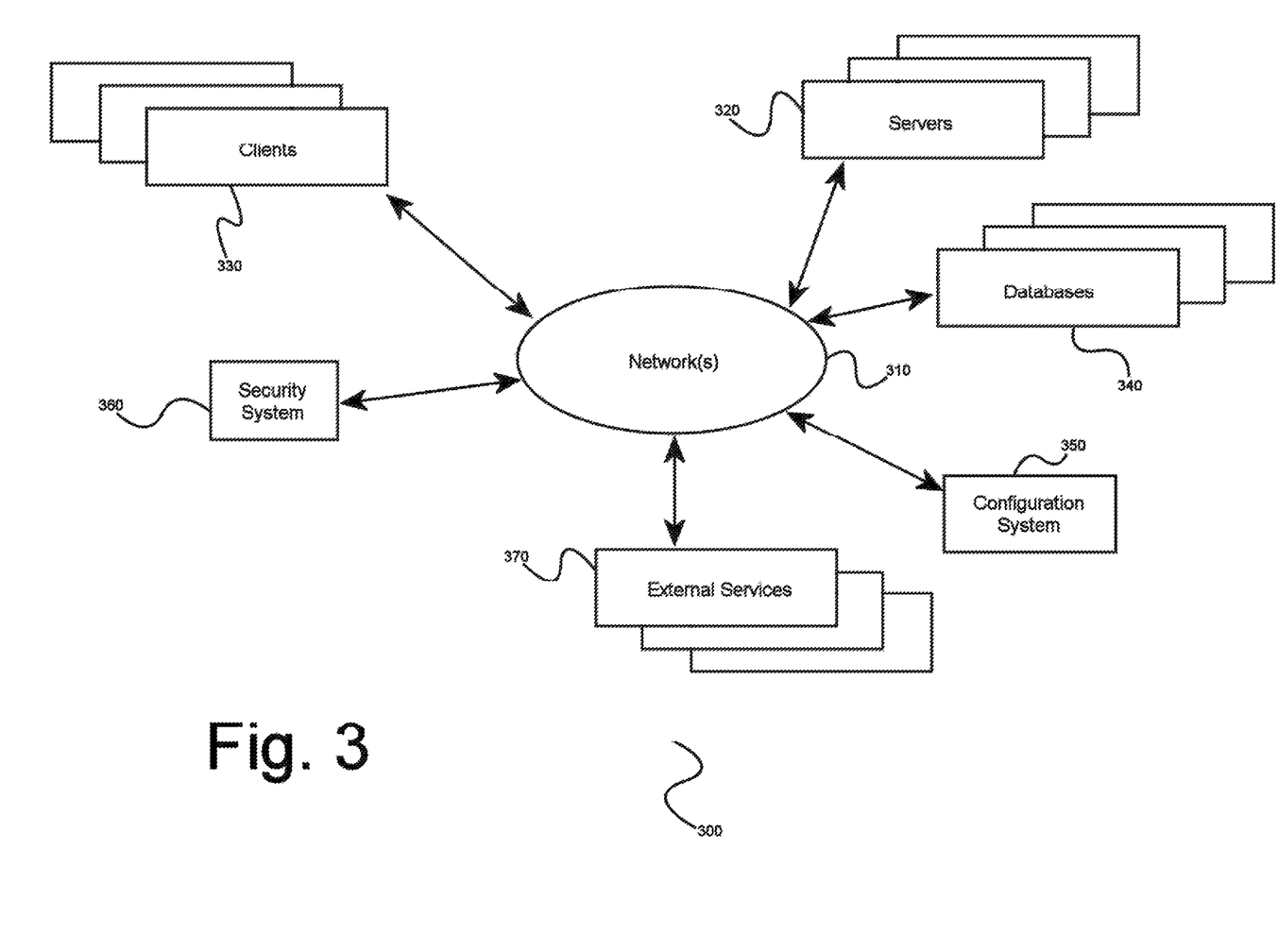
FIG. 3 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, MongoDB, Redis and so forth). In some embodiments variant database architectures such as column-oriented databases, in-memory databases, clustered databases, distributed databases, key-value stores, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

Figure 4:
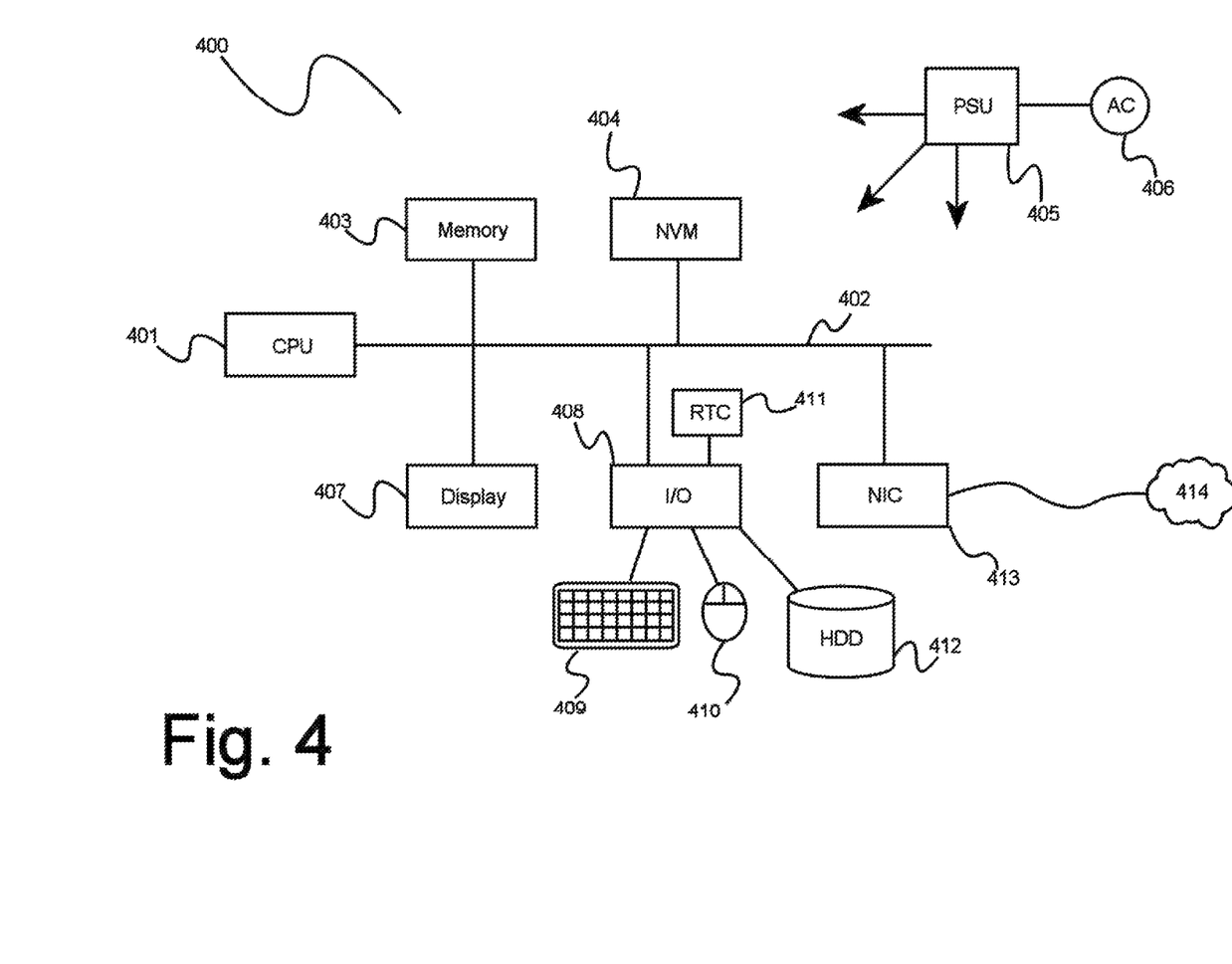
FIG. 4 is a block diagram illustrating an exemplary overview of a computer system as may be used in any of the various locations throughout the system

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
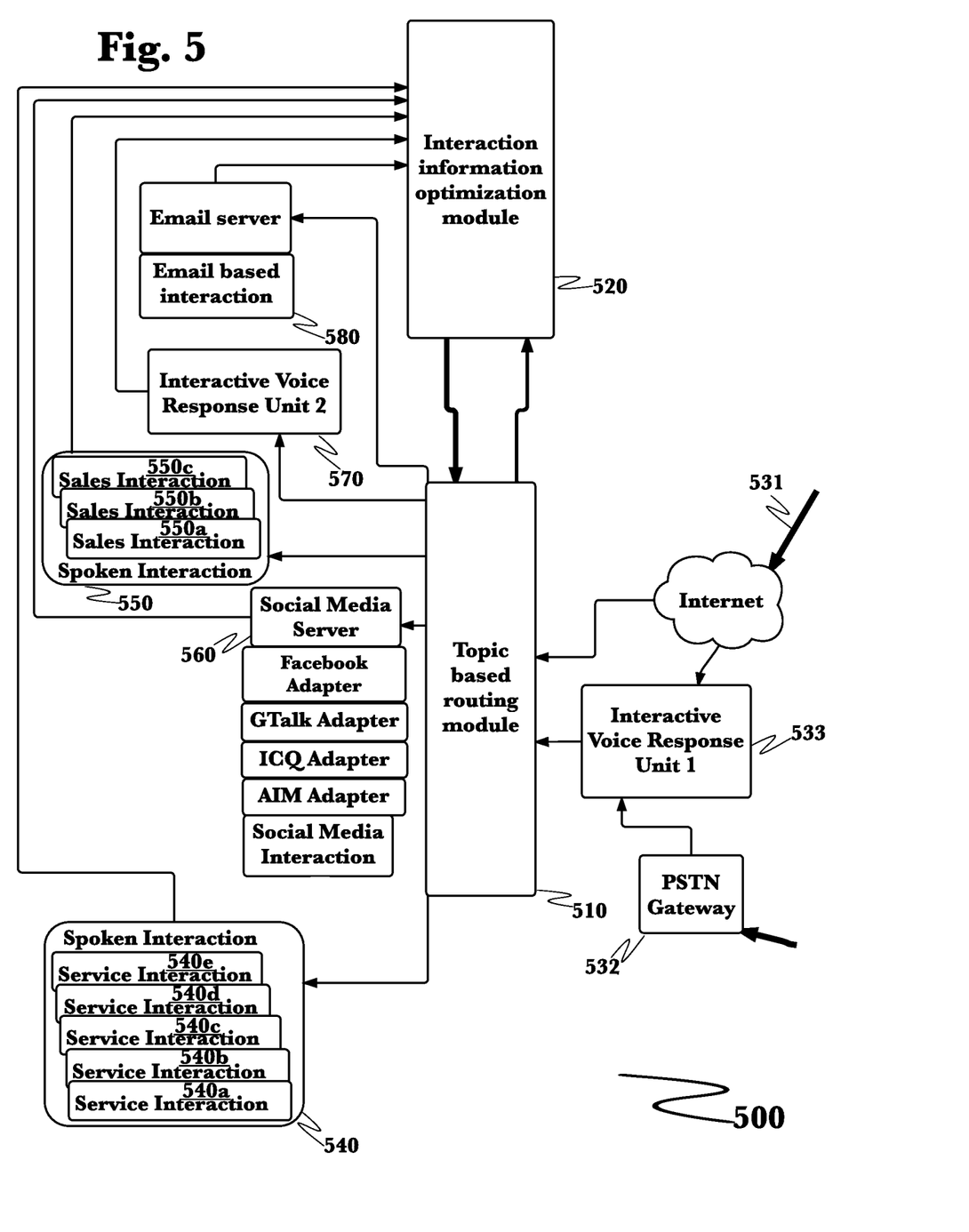
FIG. 5 is a diagram of an exemplary architecture of a system an optimized, self-learning and self-organizing contact center for according to an embodiment of the invention.

FIG. 5 is a diagram of an exemplary architecture of a system an optimized, self-learning and self-organizing contact center for according to an embodiment of the invention 500. According to the embodiment, customer requests 531, 532, which may be voice, email, web-based, or by any other communication means known to those skilled in the art, may be received at a topic-based routing module 510, for example after retrieval of information from spoken interaction with a customer. A request 531, 532 may be parsed for word makeup and construction such that a topic about which the customer is communicating can be inferred, and may then be matched to topics known to the system and the customer may be routed to a contact center resource such as (for example, including but not limited to) a customer service representative 540, a sales representative 550, or an interactive voice response (IVR) 570 that may have the information and skill set to best address the customer's topic.

Topic-based routing module 510 may infer topics from customer interactions using a variety of techniques, generally resulting in a logical topic consisting of one or more words that describes the intent or subject matter of a customer's interaction, or an issue they wish to have handled. Machine learning algorithms may be used to algorithmically compute the most-likely topic for any given interaction using probabilistic modeling, for example by utilizing latent Dirichlet allocation to take as input variables the words parsed from an opening interaction with the customer, for example words spoken in response to the prompts of the initial IVR 533; or the words found in a contact email from a customer or words parsed from a social media message sent to the contact center; and then attempts to map them to particular pre-selected main topics, sub-topics and topic-specific identifiers, to arrive, as closely as possible, at the exact circumstances that generated a customer's contact as well as an indication of the complexity of the customers issue. Greater accuracy in the process may be achieved by analyzing the "closeness", or the degree to which a match is found, between a customer's words and one topic word over another. For example, there may be 22% of the words that relate to a software failure in process "A1" whereas 55% of the words may relate to a failure in hardware module "MA3" which runs "A1" amongst other less visible processes. The remaining 33% of the words may relate to an installation problem with a new server the customer's company has ordered, which in unrelated to the first major generative reason for the call, but will need to be addressed by the sales team at some independent point. While it is clear that this embodiment makes integral use of the latent Dirichlet allocation, the invention does not depend on any specific method. Additional pertinent information, such as customer disposition can also be analyzed at this point using voice analysis methods known to the art, to better route the communication. Additionally, through probabilistic modeling and analysis, topic inference can adapt to changes in the market or industry, as match ratios shift over time or in response to new topics occurring or old topics becoming less frequent. This approach also accounts for hidden variables, by enabling analysis of the underlying psychological state of a customer through their interaction content. For example, analysis of word choice, grammar, inflection, or other speech (or text) patterns may be used in a joint probability distribution to infer hidden variables in addition to the apparent information available through simple word or pattern-recognition. Additionally, this approach may be used to optimize contact center operations under uncertainty, by using stochastic optimization in automated algorithmic processing, to minimize an objective function and thereby minimize expectation values to arrive at an optimum arrangement given limited or uncertain information.

The information employed by the topic based routing module 510 once the message has been parsed is obtained on an ongoing basis from the interaction information optimization module 520, which continuously monitors all incoming and outgoing communication of the contact center. This module 520 uses current information theory such as the latent Dirichlet allocation to analyze and transform the information from the contact center's sphere of communication, all incoming and outgoing communication, into business usable form such as the topics and topic specific identifiers and thus to infer the hidden generative impetus the customer has for communication which may include underlying product status, expectations from communication and mindset at the time of communication. Such deep analysis of the incoming request and that of the outgoing message in conjunction with information theory allows measure of the information distance, difference, or gap between the information that the customer requests and the information included in the response of either an electronic or human resource, with the gap measured in both substance, for example, "Did the topic of information given by a contact center interaction exactly match a topic for which the customer made contact?" and with respect to complexity or depth, for example "Did a customer contact to request voltage requirement information for a machine they need to move and was sent an engineer's wiring diagram for the machine, that has that information buried on page 5?".

Application of information theory principles, with latent Dirichlet allocation being an apropos, though not necessarily an exclusive example, by the interaction information optimization module further allows each specific human agent in the contact center to be ranked for strength or weakness over each specific topic and topic identifier distribution set based upon inferences gleaned from the agents' CVs, contact center specific interactions to date and any other proficiency related data available such as training certificates or in-house work projects. These inferred agent appraisals drive efficient and effective routing of a particular customer request to a specific agent, for example to service interaction 540*c* instead of other possible service interactions 540*a*, 540*b*, 540*d*, 540*e* when the topic based router determined that, for example, a frustrated customer is calling about a failure of a particular software product and a service agent at 540*c* has, for example, taken and completed a course in the particular software product configuration and troubleshooting and also has, for example, a continuing development certificate in conflict resolution, or, for example, a sales request for product "A" where the terms used by a customer generate inference that the customer really needs product "B" or products "A" and "C" but will require extensive and specific technical data for a successful sales encounter, being routed to sales interaction 550*c* instead of sales interaction 550*a* or sales interaction 550*b* as the sales agent at 550*c* was the sales agent that determined why product "B" is needed under current conditions. These same types of topic analysis and hidden generative data inference also allow accurate and efficient of routing between electronic IVR 531, web server 532 and email server 533; and human agent resources 540 to 550 based on the depth and complexity of the request as well as inferred customer acumen on the subject.

Additionally, agent skills may be automatically defined and adjusted based on any available historical data, such as using inferred agent appraisal information, an agent's CV, previous interactions an agent has handled, or any training they have received. This enabled agents to be automatically assigned to skills and interactions queues for which they are most suited, optimizing the internal arrangement of resources within a contact center to improve performance. This may be further utilized to automatically identify call types, for example identifying specific recurring topics or groups of topics and assigning them to a particular call type, which may then drive automatic configuration of new routing rules for this call type. A short-term "policy function" may be utilized to drive automated routing that incorporates a number of variables, accommodating the automated configuration of calls, topics, and agents as well as the ability to incorporate derived hidden variables to (for example) predict future states or outcomes. This policy function may be used in addition to, or in place of, traditional routing policies that are more rigid, enabling automatic configuration to be implemented in combination with traditional routing, for example to maintain a degree of fixed routing policies or to use automated configuration for only a subset of contact center operations (for example, for certain departments or during certain time periods, or for testing purposes as a "trial run" of automatic operations). This, combined with automatic agent management, enables a fully-automated, self-organizing contact center that recognizes call types, establishes routing rules and interaction queues, identifies agent skills and performance, assigns agents to the automatically-generated queues and skill sets, and then routes interactions based on their topic. This is particularly useful in cases where there may be little structured information available about a particular customer or agent (for example, for rapidly introducing newly-hired agents or accommodating first-time callers), and in areas where the nature of the business may be changing rapidly such as in technology or sales. This additionally enhances support for multi-tenant contact centers or service providers that may need to be able to handle many different industry, customer, or agent types simultaneously while optimizing routing and interaction handling. In this manner, it can be appreciated that the workings of the interaction information optimization modules allows the system to self-organize the contact center and optimize routing policy without fore-knowledge on the part of the designers, the same analyses permit the system to infer crucial parameters including but not limited agent staffing levels, including geographical placement of specific resources, the correct mixture and role sharing of electronic and human resources and to keep up with changes in product lines and service procedures autonomously.

Description of Method Embodiments

Figure 6:
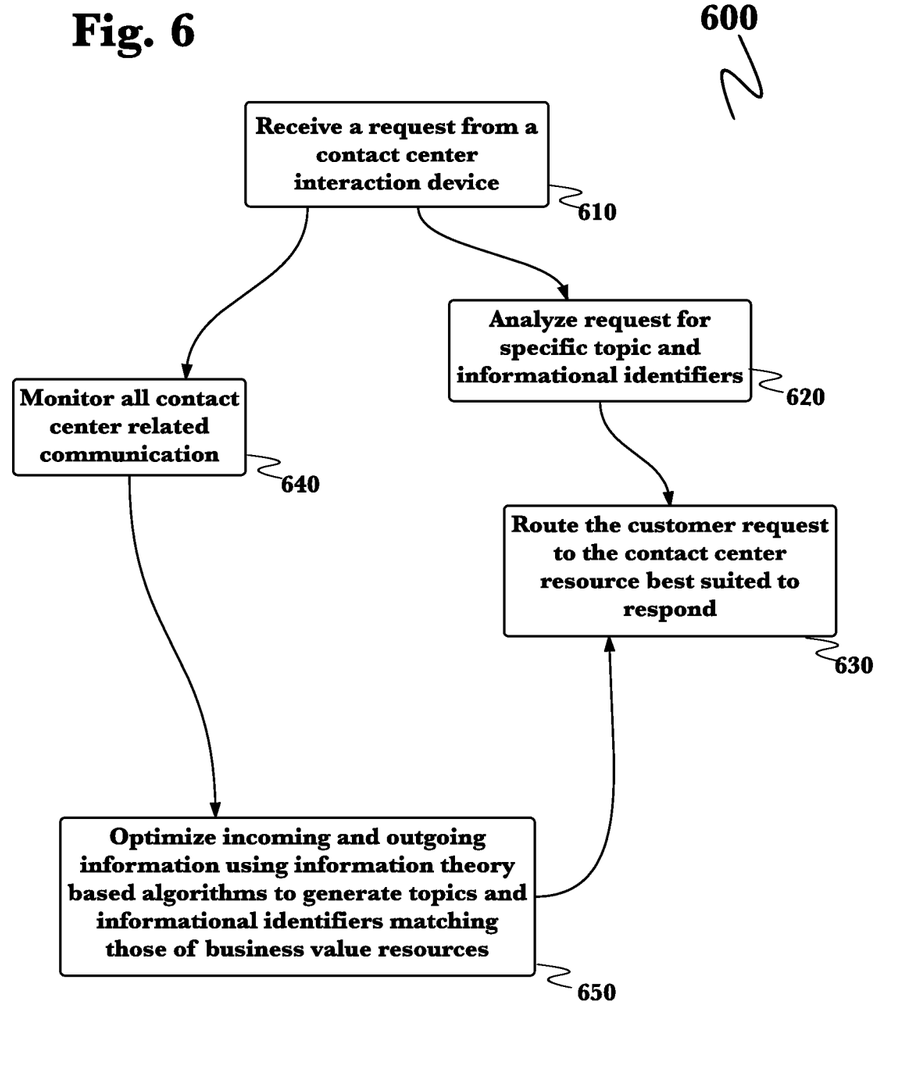
FIG. 6 is a process flow diagram of a method for the operation of an optimized, self-learning and self-organizing contact center according to an embodiment of the invention.

FIG. 6 is a process flow diagram of a method 600 for the operation of an optimized, self-learning and self-organizing contact center according to an embodiment of the invention. In embodiment first step 610, system 500 receives a request for assistance over telephony as shown by 532 to 533, email as illustrated by 531 or messaging as illustrated by 531. For example, the request could be over voice, through email, by use of the enterprise's web site of by any other electronic means known in the art. The request is immediately analyzed in step 620, performed by the topic based routing module illustrated by 510 using information theory tools such as but not limited to latent Dirichlet allocation, which in this use takes as variables the words parsed from an opening interaction with the customer, for example: words spoken in response to the prompts of the greeting interactive voice unit (see 533); or words found in a contact email from a customer or words in the topic based routing module 510; parsed from a instant message in the topic based routing module 510 sent to the contact center; and then attempts to map them to particular pre-selected main topics, sub-topics and topic specific identifiers, to arrive as, closely as possible, at the exact circumstances that generated a customer's contact as well as an indication of the complexity of the customer's issue. Greater accuracy in the process comes about as the tightness with which the customer's words relate to one topic word over another is analyzed, there may be 22% of the words that relate to a software failure in company software process "A1" whereas 55% of the words may relate to a failure in company hardware module "MA3" which runs process "A1" amongst other less visible software processes. The remaining 33% of the words may relate to an installation problem with a new company server the customer's company has ordered, which is unrelated to the first major generative reason for the call, hardware module "MA3", but will need to be addressed by the sales team at some independent point, to identify the closely related topic words and topic related identifiers that permit hidden generative information such as product purchase process point for sales or customer contact expectations for service to be inferred. Once the specific nature and environment of the request is inferred, the request is routed to the contact center resource best suited to efficiently respond in step 630, which might be a service interaction device illustrated by 540, a sales interaction device illustrated by 550, the social media interaction engine illustrated by 560, a predetermined answer pathway on the interactive voice response unit (see 570), or, an email based response providing the requested information illustrated by 580, based again upon information theory predictors of the complexity and depth of the requested information, the capabilities of the electronic resources available and the individual knowledge and skill sets of individual agent interactions over the topic plus nuances of the request. All information entering and leaving the contact center is also monitored in step 640, accomplished through the interaction information optimization module (see 520) and analyzed under information theory tools to record such important parameters and the information distance or gap between the information requested and the information given in the response, the actual end result of interactions using specific topic, topic identifier distribution combinations: for example, determining that a customer requesting information on product "A" using a specific topic-topic identifier distribution combination usually buys product "C"; efficiency of resource usage: for example, determining that requests that use a specific topic-topic identifier distribution that are currently routed to human agents but the interaction that follows shows that an automated resource will perform as just as well and reserve the human agent for interactions of more worth to the business ?; Staffing levels and makeup can also be inferred, do we employ five network engineers whereas our request makeup indicates we need only two network engineers and one additional developer step 650, carried out by the interaction information optimization module illustrated by 520. Last, the information theory based algorithms used by the system allows it to automatically recognize changes in product line, service processes and contact center usage by customers and rapidly adapt accordingly.

The skilled person will be aware of a range of possible modifications of the various embodiments described above. Accordingly, the present invention is defined by the claims and their equivalents.

What is claimed is:

1. A self-learning and self-organizing contact center routing system comprising:
    a topic-based routing module stored in a memory of and operating on a processor of a computing device; and
    an interaction information optimization module stored in a memory of and operating on a processor of a computing device;
    wherein the interaction information optimization module:
        continuously monitors all communications into and out of the contact center;
        for each incoming communication, analyzes the incoming communication using probabilistic models to identify any topics and hidden variables within the incoming communication that led a contact center customer to initiate the incoming communication;
        for each outgoing communication, identifies the outgoing communication in response to a particular incoming communication;
        determines an effectiveness of a response to each incoming communication by comparing the topics and hidden variables identified from the analysis of the incoming communication with a plurality of topics and hidden variables identified by similar analyses of corresponding outgoing communications for each respective incoming communication; and
        ranks each human agent in the contact center based on the agent's knowledge of, experience with, and determined effectiveness for each identified topic and hidden variable; and wherein the topic-based routing module:
  receives a text request for assistance from a user via a network;
  automatically identifies a specific human agent best suited to service the request based on the rankings from the interaction information optimization module pertaining to a topic and a hidden variable derived from the text request; and
  automatically routes the request directly to the specific human agent.

2. A method for self-learning and self-optimizing contact center routing, comprising the steps of:
  (a) continuously monitoring, at an interaction information optimization module stored in a memory of and operating on a processor of a computing device, all communications into and out of a contact center;
  (b) analyzing each incoming communication to the contact center using probabilistic models to identify any topics and hidden variables within the communication that may have led a contact center customer to initiate the incoming communication on those topics;
  (c) determining an effectiveness of a response to each incoming communication by comparing information obtained from the analysis of the incoming communication with a plurality of topics and hidden variables identified by similar analyses of corresponding outgoing communications for each respective incoming communication;
  (d) ranking each human agent in the contact center based on the agent's knowledge of, experience with, and determined effectiveness for each identified topic and hidden variable;
  (e) receiving, at a topic-based routing module stored in a memory of and operating on a processor of a computing device, a text request for assistance from a user via a network;
  (f) automatically identifying a specific human agent best suited to service the request based on the rankings pertaining to a topic and a hidden variable derived from the text request; and
  (g) automatically routing the request directly to the specific human agent best suited to service the request.

* * * * *